United States Patent Office 3,346,644
Patented Oct. 10, 1967

3,346,644
DIFLUORAMINO ETHERS AND THEIR PREPARATION
Charles B. Colburn, Huntsville, Ala., assignor to Rohm & Haas Company, Philadelphia, Pa., a corporation of Delaware
No Drawing. Filed Apr. 17, 1963, Ser. No. 274,383
11 Claims. (Cl. 260—584)

This invention concerns processes for the preparation of ethers which contain difluoramino groups and the products produced thereby. More particularly, it concerns a method of producing difluoramino-containing ethers by reacting ethers with tetrafluorohydrazine, $N_2F_4$, under the influence of ultraviolet light.

The utility of the compounds produced by the process of the present invention varies with the molecular weight of the ethers employed as the reactant with $N_2F_4$. For instance, the sym-bis(difluoramino) ethers prepared by the reaction of $N_2F_4$ with dimethyl and diethyl ethers are suitable for propellant applications in that they have high specific impulse. Of particular interest as a storable monopropellant is $NF_2CH_2OCH_2NF_2$, which compound has a calculated specific impulse of 300. It can also be used as an oxidizer in propellant formulations.

The higher ethers on treatment with $N_2F_4$ give a variety of products which constitute a complex mixture, but these mixtures need not be separated to be used as solvents for nitrogen-containing polymers which are high energy polymers, or for plasticizers for the same type of compounds. As indicated, the lower dialkyl ethers give the preferred products for propellant applications.

Insofar as the ethers are concerned, a wide variety of ethers will undergo reaction with $N_2F_4$, and alkyl ethers with $C_{1-10}$, aryl ethers, alkaryl or aralkyl ethers can be employed. Preferred are the dialkyl ethers in which the alkyl group is $C_{1-10}$, and particularly preferred are dimethyl and diethyl ethers.

Any source of ultraviolet light, is satisfactory and an Hanovia mercury high pressure lamp proved to be particularly suitable.

The reaction temperature is not too critical and, particularly with the lower dialkyl ethers, ambient temperatures prove to be satisfactory. The term "ambient temperatures" defines temperatures in the range of 20° to 30° C.

The process is preferably conducted under anhydrous conditions, and not only should the reaction equipment be dried, but the reactants should also be dried prior to reaction.

Because some of the reaction products, particularly the lower molecular weight, high $NF_2$-containing products, will ignite on exposure to air, the reaction must be conducted in an inert atmosphere, preferably in the presence of an inert gas, such as helium, argon or nitrogen. If the system is evacuated and flushed with nitrogen prior to use, an inert gas is not required, but it is preferred to use one since it aids in sweeping the products from the reaction vessel. The inert gas will generally constitute from 10% to 20% by volume of the reaction mixture.

The reaction pressure is not critical and sub- or superatmospheric pressures can be employed.

Depending on the temperature, the reaction time will vary from 1 to 24 hours, the completion of the reaction being readily determined by the fact that there is no further decrease in the pressure in the reaction vessel on continued ultraviolet light irradiation. The pressure in the reaction vessel decreases as the reaction proceeds because the reaction products have lower vapor pressure than either of the reactants.

The ratio of ether to tetrafluorohydrazine can be varied widely without departing from the scope of this invention, and can be from 1 mole of ether to 5 moles of $N_2F_4$ to 5 moles of ether to 1 mole of $N_2F_4$. A particularly preferred ratio is one mole of ether to 2 moles of $N_2F_4$.

The completion of the reaction is detected when the total pressure of the system no longer changes with time upon further irradiation. The reaction is accompanied by a decrease in the total pressure of the system as the products of the reaction are less volatile than are the reactants.

The structure of the products was established by infrared, mass spectral and N.M.R. analysis. Elemental analysis is impossible because of the lack of stability of the products.

*Example*

One to two ml. of ether is condensed into a 1½ to 2 liter reaction bulb containing a quartz window. Two hundred mm. of pressure of $N_2F_4$ is introduced into the reaction bulb and the ether and $N_2F_4$ allowed to warm up to room temperature.

The ultraviolet bulb is then turned on and irradiation is continued 8 to 24 hours or until no further pressure decrease is observed. The mixture is then fractionated and chromatographed. The products obtained are from:

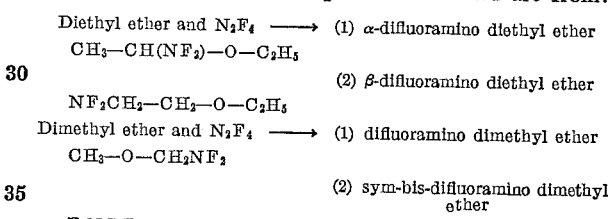

I claim:
1. Nitrogen- and fluorine-containing ethers selected from the group consisting of α-difluoramino diethyl ether, β-difluoramino diethyl ether, difluoramino dimethyl ether, and sym-bis(difluoramino)dimethyl ether.
2. α-Difluoramino diethyl ether.
3. β-Difluoramino diethyl ether.
4. Difluoramino dimethyl ether.
5. Sym-bis(difluoramino)dimethyl ether.
6. A process for the preparation of difluoramino ethers which comprises reacting lower alkyl ethers and tetrafluorohydrazine, $N_2F_4$, under the influence of ultraviolet light.
7. A process as set forth in claim 6 in which the reaction is conducted at ambient temperatures.
8. A process as set forth in claim 6 in which the molar ratio of ether to $N_2F_4$ is from 1 to 5 to 5 to 1.
9. Process for the preparation of difluoramino ethers which comprises reacting lower alkyl ethers and tetrafluorohydrazine, $N_2F_4$, in the presence of an inert gas under the influence of ultraviolet light.
10. Process as set forth in claim 9 in which the inert gas is selected from the group consisting of nitrogen, argon and helium.
11. A process as set forth in claim 9 in which the reaction is conducted under anhydrous conditions.

References Cited
UNITED STATES PATENTS 3,166,595  1/1965  Frazer _____ 260—583
3,214,465 10/1965  Sausen _____ 260—543

CHARLES B. PARKER, *Primary Examiner.*
B. BILLIAN, *Assistant Examiner.*